United States Patent
Anzai et al.

(10) Patent No.: US 9,444,755 B2
(45) Date of Patent: Sep. 13, 2016

(54) PACKET PROCESSING METHOD AND PACKET PROCESSING DEVICE

(71) Applicant: ANRITSU NETWORKS CO., LTD., Atsugi-shi (JP)

(72) Inventors: Kenji Anzai, Atsugi (JP); Ryota Watanabe, Atsugi (JP)

(73) Assignee: Anritsu Networks Co., Ltd., Atsugi-shi (JP)

( * ) Notice: Subject to any disclaimer, the term of this patent is extended or adjusted under 35 U.S.C. 154(b) by 94 days.

(21) Appl. No.: 14/532,515

(22) Filed: Nov. 4, 2014

(65) Prior Publication Data

US 2016/0127247 A1    May 5, 2016

(51) Int. Cl.
| | |
|---|---|
| *H04L 12/805* | (2013.01) |
| *H04L 12/26* | (2006.01) |
| *H04L 12/825* | (2013.01) |
| *H04L 12/801* | (2013.01) |
| *H04L 12/841* | (2013.01) |

(52) U.S. Cl.
CPC ......... *H04L 47/365* (2013.01); *H04L 43/0864* (2013.01); *H04L 47/10* (2013.01); *H04L 47/25* (2013.01); *H04L 47/283* (2013.01)

(58) Field of Classification Search
CPC ... H04L 47/10; H04L 47/22; H04L 47/2416; H04L 47/25; H04L 47/193; H04L 47/27; H04L 47/283; H04L 69/16
See application file for complete search history.

(56) References Cited

U.S. PATENT DOCUMENTS

| | | | | |
|---|---|---|---|---|
| 7,035,214 | B1* | 4/2006 | Seddigh | H04L 1/1635 370/231 |
| 2007/0008883 | A1* | 1/2007 | Kobayashi | H04L 47/40 370/230 |
| 2011/0216648 | A1* | 9/2011 | Mehrotra | H04L 47/30 370/230 |
| 2011/0219287 | A1* | 9/2011 | Srinivas | G06F 11/10 714/781 |
| 2011/0305151 | A1 | 12/2011 | Takahara | |

FOREIGN PATENT DOCUMENTS

JP    2008-205932    9/2008

OTHER PUBLICATIONS

Sangtae Ha et al.; "CUBIC: A New TCP-Friendly High-Speed TCP Variant"; pp. 1-11.

* cited by examiner

*Primary Examiner* — David Oveissi
(74) *Attorney, Agent, or Firm* — Greer Burns & Crain Ltd.

(57) ABSTRACT

To provide a packet processing device that prevents a reduction in the efficiency of data communication. A packet processing device 100 estimates a time, which is taken until an acknowledgement corresponding to a packet is received after transmitting the packet to a client 30, as the round-trip delay time of the packet, determines the size of data that is divided into packets and is continuously transmitted to the client 30, and updates the transmission rate of packets transmitted to the client 30 according to the data size and the round-trip delay time.

6 Claims, 4 Drawing Sheets

PACKET PROCESSING METHOD AND PACKET PROCESSING DEVICE

TECHNICAL FIELD

The present invention relates to a packet processing method and a packet processing device.

BACKGROUND ART

When transmitting transmission data based on the protocol of Transmission Control Protocol (TCP)/Internet Protocol (IP), the transmission data is packetized by a transmission side device, and the packets are transmitted to a receiving side device. In Non-Patent Document 1, CUBIC is shown as an example of the congestion control algorithm that is used in order to avoid congestion when transmitting the transmission data based on the protocol of TCP/IP.

CUBIC controls the size of data that the transmission side device can transmit continuously without waiting for an acknowledgement from the receiving side device.

A transmission side device using CUBIC reduces the size of data that can be continuously transmitted without waiting for an acknowledgement when packet discard occurs. When the elapsed time from the last occurrence of packet discard is short, the size of data that can be continuously transmitted without waiting for an acknowledgement is greatly increased exponentially with respect to the elapsed time. When the size of the data that can be continuously transmitted without waiting for an acknowledgement becomes close to the saturation point, the increase in the size of data that can be continuously transmitted without waiting for an acknowledgement is set to almost zero. When more time has elapsed, the size of the data that can be continuously transmitted without waiting for an acknowledgement is slowly increased again.

That is, the transmission side device using CUBIC controls the traffic of data communication by controlling the size of data that can be continuously transmitted, thereby avoiding congestion.

RELATED ART DOCUMENT

Patent Document

[Non-Patent Document 1] "CUBIC: A new TCP-Friendly High-Speed TCP Variant", Lisong Xu, ACM SIGOPS Operating System Review, Volume 42, Issue 5, July 2008, p. 64-74

DISCLOSURE OF THE INVENTION

Problem that the Invention is to Solve

As described above, since the congestion control method using CUBIC changes the size of data that can be continuously transmitted without waiting for an acknowledgement, traffic is controlled. However, the congestion control method just limits the size of data that can be continuously transmitted without waiting for an acknowledgement. Accordingly, an instantaneous burst repeatedly occurs. In the instantaneous burst, a probability of the occurrence of packet discard or the like is high. Due to the packet discard, retransmission of the packets occurs, resulting in a reduction in the transmission rate. That is, in the congestion control method using CUBIC, there has been a problem that a probability that the transmission efficiency of transmission data will be lowered is high.

The present invention has been made in order to solve the above-described problem in the related art, and it is an object of the present invention to provide a packet processing method and a packet processing device that can prevent a reduction in the efficiency of data communication of transmission data.

Means for Solving the Problem

A packet processing method of the present invention is a packet processing method performed by a packet processing device (100) that receives packets sequentially from a transmission side device (10) and transmits the packets to a receiving side device (30), and includes: a response receiving step (S60) of receiving an acknowledgement that is transmitted from the receiving side device corresponding to the packets transmitted to the receiving side device; a round-trip delay time estimation step (S60) of estimating a time, which is taken until the acknowledgement corresponding to the packets is received from the receiving side device after the packets are transmitted to the receiving side device, as a round-trip delay time of the packets; a size determination step (S70) of determining a size of data that is divided into the packets and is continuously transmitted to the receiving side device even if the transmission side does not receive an acknowledgement; a transmission rate update step (S80) of updating a transmission rate of packets transmitted to the receiving side device according to the size of the data determined in the size determination step and the round-trip delay time estimated in the round-trip delay time estimation step; and a transmission step (S90) of transmitting the packets to the receiving side device at uniform time intervals and at the transmission rate updated in the transmission rate update step.

Through this configuration, in the packet processing method of the present invention, the transmission rate of packets transmitted from the packet processing device to the receiving side device is updated according to the data size determined in the size determination step and the round-trip delay time estimated in the round-trip delay time estimation step, and the packets are transmitted to the receiving side device at the updated transmission rate and at uniform time intervals.

Since the packets are transmitted to the receiving side device at the updated transmission rate and at uniform time intervals, the congestion of packets is avoided. Accordingly, a probability of the occurrence of packet discard or the like is suppressed, and a reduction in the transmission rate due to packet retransmission is suppressed.

In addition, the round-trip delay time estimation step may be performed whenever the packet processing device receives the acknowledgement from the receiving side device.

By this method, it is possible to make the packet transmission rate correspond to the latest communication state at all times.

In addition, in the size determination step, the size of the data may be increased or decreased according to a reception situation of the acknowledgement received in the response receiving step.

By this method, even if the acknowledgement reception situation changes with the situation of traffic, it is possible to ensure the packet transmission rate corresponding to the traffic since the size of data is increased or decreased according to the change.

A packet processing device of the present invention is a packet processing device (100) that receives packets sequentially from a transmission side device (10) and transmits the packets to a receiving side device (30), and includes: a response receiving unit (130) that receives an acknowledgement that is transmitted from the receiving side device corresponding to the packets transmitted to the receiving side device; a round-trip delay time estimation unit (150) that estimates a time, which is taken until the acknowledgement corresponding to the packets is received from the receiving side device after the packets are transmitted to the receiving side device, as a round-trip delay time of the packets; a size determination unit (160) that determines a size of data that is divided into the packets and is continuously transmitted to the receiving side device even if the transmission side does not receive an acknowledgement; a transmission rate update unit (170) that updates a transmission rate of packets transmitted to the receiving side device according to the size of the data determined by the size determination unit and the round-trip delay time estimated by the round-trip delay time estimation unit; and a transmission unit (120) that transmits the packets to the receiving side device at uniform time intervals and at the transmission rate updated by the transmission rate update unit.

In the packet processing device of the present invention, the transmission rate of packets transmitted from the packet processing device to the receiving side device is updated according to the data size determined by the size determination unit and the round-trip delay time estimated by the round-trip delay time estimation unit, and the packets are transmitted to the receiving side device at the updated transmission rate and at uniform time intervals.

Since the packets are transmitted to the receiving side device at the updated transmission rate and at uniform time intervals, the congestion of transmission data is avoided. Accordingly, a probability of the occurrence of packet discard or the like is suppressed, and a reduction in the transmission rate due to packet retransmission is suppressed. In addition, the round-trip delay time estimation unit may estimate the round-trip delay time whenever the response receiving unit receives the acknowledgement. By this configuration, it is possible to make the packet transmission rate correspond to the latest communication state at all times. In addition, the size determination unit may increase or decrease the size of the data according to a reception situation of the acknowledgement received by the response receiving unit. By this configuration, even if the acknowledgement reception situation changes with the situation of traffic, it is possible to ensure the packet transmission rate corresponding to the traffic since the size of data is increased or decreased according to the change.

Advantage of the Invention

According to the present invention, it is possible to provide a packet processing method and a packet processing device that prevent a reduction in the efficiency of data communication.

BEST MODE FOR CARRYING OUT THE INVENTION

Hereinafter, an embodiment of the present invention will be described with reference to the accompanying drawings.

Figure 1:
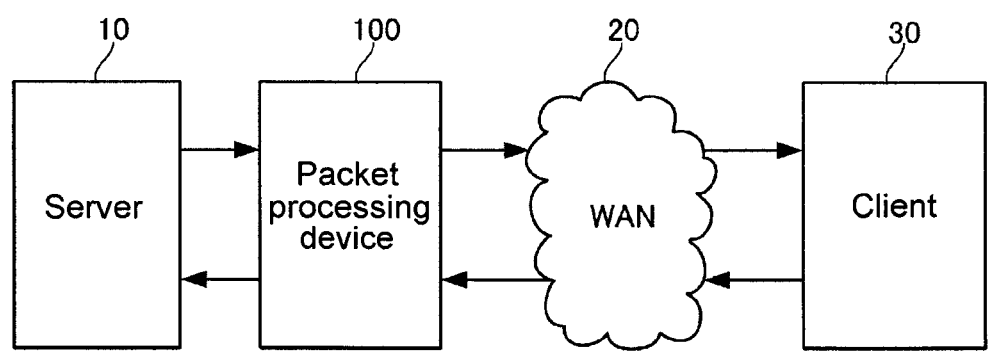
FIG. 1 is a diagram showing a packet processing device, a server, and a client in an embodiment of the present invention.

First, the configuration will be described. As shown in FIG. 1, a packet processing device 100 is connected to a server 10 as a transmission side device that transmits packetized transmission data, and is connected to a client 30 as a receiving side device through a Wide Area Network (WAN) 20.

According to the Transmission Control Protocol (TCP)/Internet Protocol (IP) as a transmission control protocol, the server 10 packetizes transmission data by adding a header thereto and transmits the packets to the client 30. The header added to transmission data includes control information, such as a transmission source port number, a transmission destination port number, a transmission source IP address, a transmission destination IP address, and a sequence number.

According to the protocol of TCP/IP, the client 30 receives the packetized transmission data, and transmits an acknowledgement corresponding thereto to the server 10 and performs predetermined processing on the received transmission data. Not only the information of the size of data that the client 30 can receive but also control information, such as a transmission source port number, a transmission destination port number, a transmission source IP address, a transmission destination IP address, and an acknowledgement number, is included in the acknowledgement that the client 30 transmits to the server 10.

The packet processing device 100 relays the packets transmitted from the server 10 and the acknowledgement transmitted from the client 30.

The server 10 uses a congestion control algorithm. As a congestion control algorithm used in the server 10, for example, CUBIC may be used.

The congestion control algorithm calculates the size of the data that the server 10 can transmit continuously without waiting for an acknowledgement from the client 30. The server 10 sets the size of data that can be continuously transmitted, which has been calculated by the congestion control algorithm, as the size of data that can be continuously transmitted to the client 30. In addition, the server 10 may compare the size of data calculated by the congestion control algorithm with the size of data that the client 30 can receive and set the smaller one as the size of data that can be continuously transmitted to the client 30.

Figure 2:
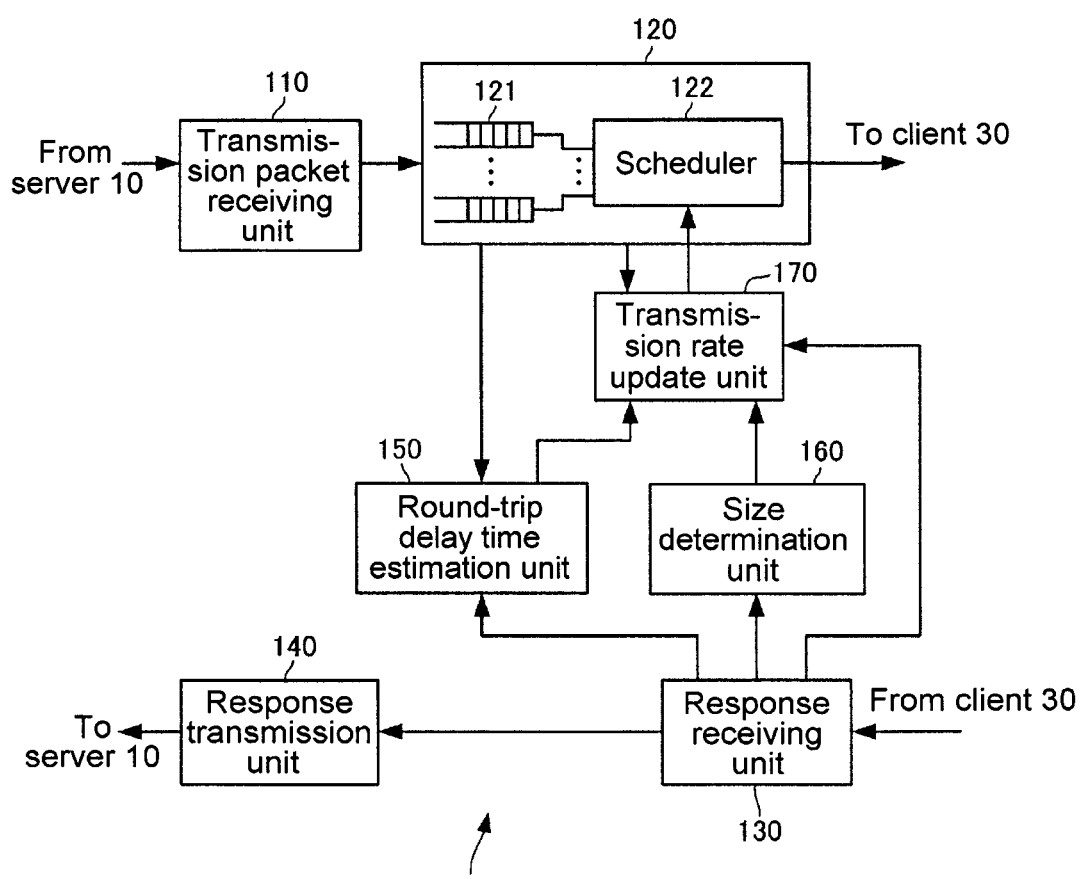
FIG. 2 is a block diagram showing the packet processing device of the embodiment of the present invention.

As shown in FIG. 2, the packet processing device 100 includes a transmission packet receiving unit 110, a packet transmission unit 120, a response receiving unit 130, a response transmission unit 140, a round-trip delay time estimation unit 150, a size determination unit 160, and a transmission rate update unit 170. The transmission packet receiving unit 110, the response receiving unit 130, the response transmission unit 140, the round-trip delay time estimation unit 150, the size determination unit 160, and the transmission rate update unit 170 can be configured by using a Central Processing Unit (CPU) and a memory.

The transmission packet receiving unit 110 is connected to the server 10, and sequentially receives packets transmitted from the server 10 to the client 30 and outputs the received packets to the packet transmission unit 120.

The packet transmission unit 120 includes a packet queue 121 and a scheduler 122. In the packet queue 121, the packets sequentially given from the transmission packet receiving unit 110 are stored in the end of the packet queue. The scheduler 122 determines a packet transmission time such that the packet transmission rate becomes uniform based on the packet queue transmission rate, extracts packets from the head of the packet queue when the time to that time has passed, and transmits the packets to the client 30. In addition, the packet transmission unit 120 transmits control information, which is shown in the header of the packets transmitted to the client 30, to the round-trip delay time estimation unit 150 and the size determination unit 160.

The packet queue transmission rate that the scheduler 122 of the packet transmission unit 120 refers to is sequentially updated by the transmission rate update unit 170.

The response receiving unit 130 receives an acknowledgement transmitted from the client 30 to the server 10, and outputs the acknowledgement to the response transmission unit 140. In addition, the response receiving unit 130 transmits the control information, which is shown in the header of the acknowledgement received from the client 30, to the round-trip delay time estimation unit 150 and the transmission rate update unit 170, and transmits the acknowledgement to the size determination unit 160.

The response transmission unit 140 is connected to the server 10, and transmits the acknowledgement received from the response receiving unit 130 to the server 10.

The round-trip delay time estimation unit 150 includes a timer (not shown), and measures a time, which is taken from the transmission of packets from the packet processing device 100 to the client 30 to the return of an acknowledgement corresponding to the packets from the client 30, and estimates the time as a round-trip delay time (Round-Trip Time) of packets.

In addition, the round-trip delay time estimation unit 150 may estimate the round-trip delay time using time information recorded in the packets. In addition, values estimated from a plurality of measurement results, such as a maximum value, an average value, and a minimum value, may be used as the round-trip delay time, without being limited to the result of one-time measurement.

The size determination unit 160 determines the size of data, which can be continuously transmitted to the client 30 even if the server 10 does not receive an acknowledgement, based on the acknowledgement received by the response receiving unit 130 using a congestion control algorithm. In addition, the congestion control algorithms that the size determination unit 160 and the server 10 use may not be the same.

The transmission rate update unit 170 is a block that sets and updates the transmission rate of transmission packets that are transmitted from the packet processing device 100 to the client 30. The transmission rate update unit 170 calculates a value proportional to the quotient obtained by dividing the size of data that can be continuously transmitted to the client 30, which has been calculated by the size determination unit 160, by the round-trip delay time calculated by the round-trip delay time estimation unit 150, and sets the value as a transmission rate of packets output from the scheduler 122 of the packet transmission unit 120.

The transmission rate update unit 170 updates the packet queue transmission rate of the scheduler 122 when the response receiving unit 130 receives an acknowledgement packet from the client 30. In addition, the transmission rate update unit 170 may update the packet queue transmission rate at other timings, for example, at fixed time intervals. In addition, immediately after making a connection, the transmission rate update unit 170 calculates an initial value of the packet queue transmission rate based on the initial value of the congestion control algorithm and sets the initial value of the packet queue transmission rate in the scheduler 122.

The transmission rate update unit 170 designates a specific packet queue for the packet transmission unit 120 for each connection of TCP/IP. In addition, the transmission rate update unit 170 may designate one packet queue for a plurality of TCP/IP connections. In this case, the transmission rate update unit 170 sets the total value of the transmission rates of the plurality of connections as the packet queue transmission rate.

Figure 3:
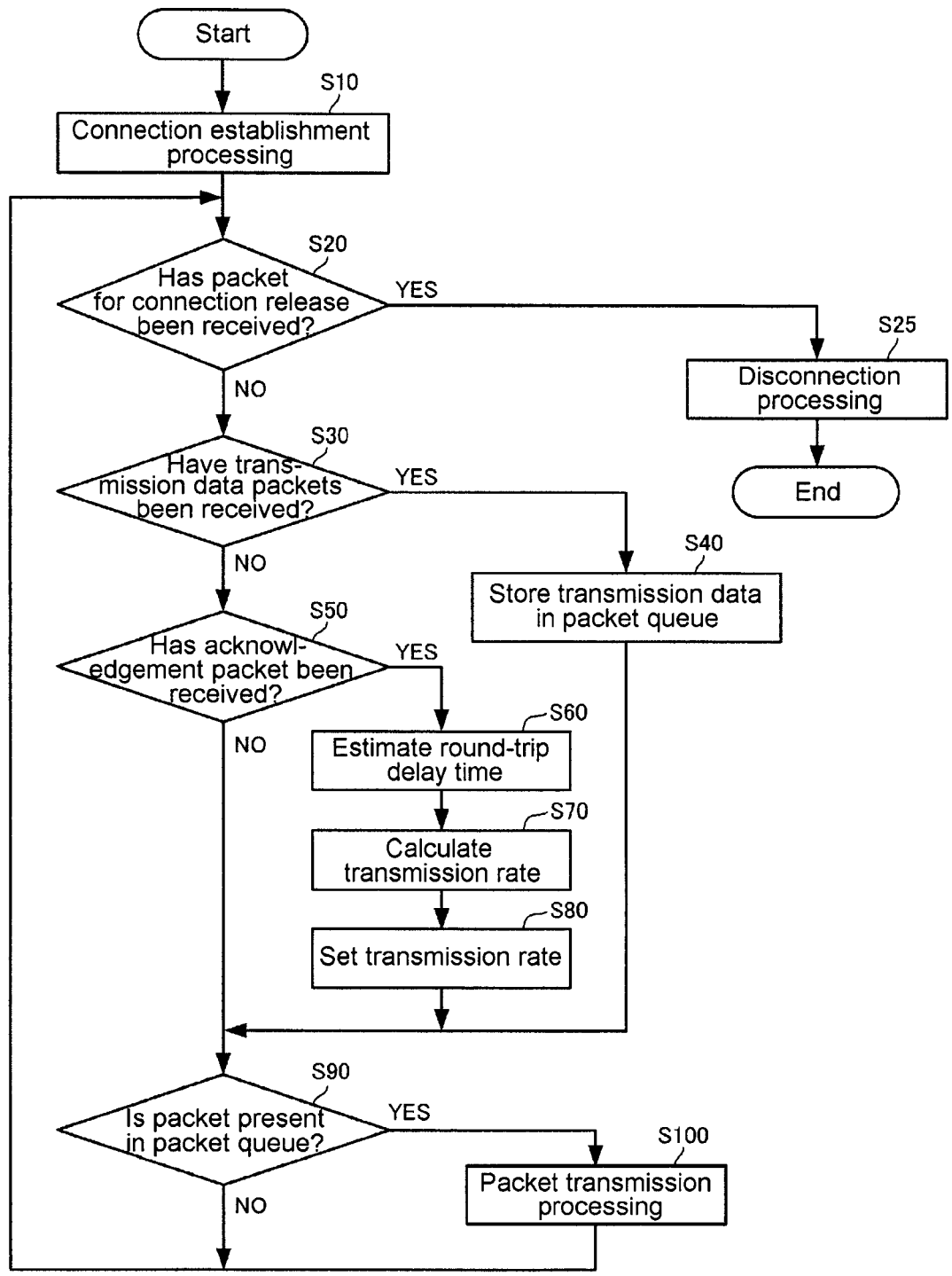
FIG. 3 is a flowchart showing a packet processing method.

Next, a packet processing method performed by the packet processing device 100 will be described with reference to FIG. 3. When a connection between the server and the client 30 is established, the server 10 transmits a packet for communication permission application to the client 30.

Control information, such as a transmission source port number, a transmission destination port number, a transmission source IP address, a transmission destination IP address, and a sequence number, is shown in the header of the packet for communication permission application. The packet processing device 100 performs connection establishment processing (step S10) when the packet for communication permission application is received.

In step S10, the transmission packet receiving unit 110 in the packet processing device 100 receives the packet for communication permission application, and transmits the packet for communication permission application to the packet transmission unit 120. The packet transmission unit 120 extracts the control information from the packet for communication permission application, and sends notification to the transmission rate update unit 170. The transmission rate update unit 170 notifies the packet transmission unit 120 of the initial value of the packet queue transmission rate and the packet queue that stores packets for each connection.

The packet queue 121 of the packet transmission unit 120 stores the packet for communication permission application in the end of the packet queue notified from the transmission rate update unit 170.

The scheduler 122 of the packet transmission unit 120 determines a packet transmission time such that the transmission rate from the packet queue becomes uniform based on the packet queue transmission rate, extracts packets from the head of the packet queue 121 when the time to that time has passed, and transmits the packets to the client 30.

The client 30 that has received the packet for communication permission application transmits an acknowledgement, which corresponds to the packet for communication permission application and indicates that the packet for communication permission application has been received, to the server 10.

The response receiving unit 130 in the packet processing device 100 receives the acknowledgement corresponding to the packet for communication permission application, and the acknowledgement is transmitted to the server 10 through the response transmission unit 140. The server 10 that has received the acknowledgement corresponding to the packet for communication permission application transmits an acknowledgement, which corresponds to the acknowledgement from the client 30, to the client 30.

The transmission packet receiving unit 110 in the packet processing device 100 receives the acknowledgement transmitted from the server 10, and the acknowledgement is stored in the packet queue 121 of the packet transmission unit 120. After a delay until the time, at which the acknowledgement is to be transmitted, by the scheduler 122, the acknowledgement is transmitted to the client 30.

Through the above processing, the connection between the server 10 and the client 30 is established, and a specific packet queue for each connection is prepared in the packet transmission unit 120. In the packet queue, an initial value of the packet transmission rate is set.

When the connection with the client 30 needs to be disconnected after the connection is established, the server 10 transmits a packet for connection release to the client 30.

In the transmission packet for connection release, control information, such as a transmission source port number, a transmission destination port number, a transmission source IP address, a transmission destination IP address, and a sequence number, is shown, and a flag indicating that the connection is disconnected is set. When the packet for connection release is received (step S20: YES), the packet processing device 100 performs disconnection processing (step S25).

In the disconnection processing (step S25), the transmission packet receiving unit 110 in the packet processing device 100 receives the packet for connection release transmitted from the server 10, and the packet for connection release is transmitted to the packet transmission unit 120.

The packet transmission unit 120 stores the packet in the end of the packet queue 121. When the packet is stored in the packet queue 121, the scheduler 122 extracts the packet from the head of the packet queue at a timing based on the packet queue transmission rate, and transmits the packet to the client 30.

When the client 30 receives the packet for connection release, the client 30 transmits an acknowledgement packet to the server 10.

The response receiving unit 130 in the packet processing device 100 receives the acknowledgement packet from the client 30, and the acknowledgement packet is transmitted to the server 10 through the response transmission unit 140. The response receiving unit 130 extracts the control information from the header of the acknowledgement packet from the client 30, and sends notification to the transmission rate update unit 170. The transmission rate update unit 170 initializes the packet queue transmission rate and the packet queue that stores packets for each connection. As a result, the connection is disconnected.

On the other hand, when transmitting the transmission data to the client 30, the server 10 packetizes the transmission data and transmits the packetized data to the client 30 in a sequential manner. Hereinafter, packets transmitted from the server 10 are referred to as transmission packets.

When transmission packets sequentially transmitted from the server 10 are received by the transmission packet receiving unit 110 in the packet processing device 100 (step S30: YES), the received transmission packets are sequentially stored in the end of the packet queue of the packet transmission unit 120 (step S40).

Here, the packet transmission unit 120 may store transmission packets of a plurality of connections in one specific packet queue. In this case, the transmission rate update unit 170 transmits the sum of the transmission rates of the plurality of connections to the packet transmission unit 120 as a packet queue transmission rate.

When transmission packets are stored in the packet queue 121 (step S90: YES), the scheduler 122 of the packet transmission unit 120 performs packet transmission processing (step S100) in which a time to transmit the transmission packets is calculated so that the transmission rate from the packet queue becomes uniform, the transmission packets are extracted from the head of the packet queue when the time to transmit the transmission packets has passed, and the transmission packets are transmitted to the client 30.

Specifically, with reference to the packet length of the transmission packet stored in the head of the packet queue, a value obtained by dividing the packet length by the packet queue transmission rate is added to the last transmission time, thereby calculating the estimated transmission time. In addition, as a method of calculating the time for transmitting the transmission packet, other calculation methods may also be used as long as the transmission rate from the packet queue is uniform.

The client 30 that has received the transmission packets from the packet processing device 100 stores the received transmission packets in a buffer, performs predetermined processing on transmission data included in the transmission packets, and transmits acknowledgements corresponding to the transmission packets sequentially to the server 10.

When the acknowledgement from the client 30 is received (step S50: YES), the response receiving unit 130 of the packet processing device 100 transmits the control information in the header of the acknowledgement to the round-trip delay time estimation unit 150. In addition, the response receiving unit 130 transmits the received acknowledgement to the size determination unit 160, and also transmits the received acknowledgement to the server 10 through the response transmission unit 140.

For the acknowledgement received by the response receiving unit 130, the round-trip delay time estimation unit 150 estimates a time, which is taken until a packet transmitted from the packet processing device 100 returns as an acknowledgement through the client 30, as a round-trip delay time of the packet (step S60).

Identification of an acknowledgement is performed by using the control information of the acknowledgement. The round-trip delay time of a packet becomes long in some conditions, such as when the physical distance between the server 10 and the client 30 is large, when the number of devices that relays packets is large, and when packets remain in a device that relays packets due to high traffic. The round-trip delay time estimation unit 150 estimates the round-trip delay time whenever the response receiving unit 130 receives an acknowledgement.

The size determination unit 160 uses a congestion control algorithm of TCP/IP protocol, such as CUBIC. The size determination unit 160 determines the size of data, which can be continuously transmitted to the client 30 even if the server 10 does not receive an acknowledgement, at each point in time from the initial information of the size of data that can be continuously transmitted to the client 30 even if the server 10 does not receive an acknowledgement, using the congestion algorithm.

The round-trip delay time estimated by the round-trip delay time estimation unit 150 and the size of the data determined by the size determination unit 160 are transmitted to the transmission rate update unit 170. The transmission rate update unit 170 newly calculates a transmission rate from the round-trip delay time and the data size transmitted from the round-trip delay time estimation unit 150 and the size determination unit 160 by the following Expression (step S70).

$$R = cWnd \times k / RTT \text{(Byte/sec)}$$

where, R: transmission rate
cWnd: size of data
RTT: round-trip delay time
k: fixed coefficient The transmission rate update unit 170 updates the packet queue transmission rate of the scheduler 122, which has been used so far, to the newly calculated transmission rate (step S80).

The transmission packets stored in the packet queue 121 are sequentially extracted from the head of the packet queue at a timing, at which the transmission rate becomes uniform, by the scheduler 122, and are transmitted to the client 30.

The packet processing device 100 repeats the processing of steps S20 to S100, and transmits the transmission packets transmitted from the server 10 sequentially to the client 30.

In the congestion control algorithm used in the server 10 and the size determination unit 160, the size of data that can be continuously transmitted to the client 30 even if the server 10 does not receive an acknowledgement is increased or decreased according to the reception situation of the acknowledgement from the client 30.

Specifically, in the congestion control algorithm used in the server 10 and the size determination unit 160, the size of data that can be continuously transmitted to the client 30 even if the server 10 does not receive an acknowledgement is increased whenever an acknowledgement is acquired from the client 30. As a result, the transmission rate is increased.

In addition, for example, when no acknowledgement is acquired from the client 30 or when the same acknowledgement continues a predetermined number of times or more, it is determined that the traffic between the server 10 and the client 30 is in a congested state and the size of data, which can be continuously transmitted to the client 30 even if the server 10 does not receive an acknowledgement, is reduced in the congestion control algorithm. As a result, the transmission rate is reduced.

As described above, the packet processing device 100 of the present embodiment estimates a time, which is taken until an acknowledgement corresponding to a packet is received after transmitting the packet to the client 30, as the round-trip delay time of the packet, determines the size of data that is divided into packets and is continuously transmitted to the client 30, and updates the transmission rate of packets transmitted to the client 30 according to the data size and the round-trip delay time. Therefore, since the congestion of traffic is suppressed, it is possible to prevent a reduction in the efficiency of data communication.

In addition, since the packet processing device 100 calculates the transmission rate by dividing the round-trip delay time by the size of data, packets can be transmitted to the client 30 at uniform time intervals. Therefore, the packet processing device 100 can suppress the congestion of traffic more effectively.

Figure 4:
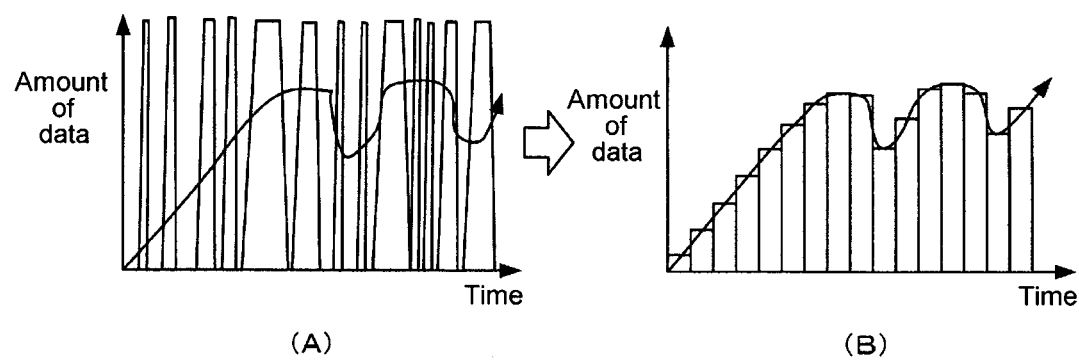
FIG. 4 is a diagram for explaining the operation of the packet processing device of the embodiment of the present invention.

In a congestion control method for controlling only the amount of data that can be transmitted at one time, a number of instantaneous bursts occur and accordingly congestion is likely to occur, as shown in FIG. 4(A). In contrast, in the packet processing method performed by the packet processing device 100, as shown in FIG. 4(B), packets are transmitted at uniform time intervals. Therefore, the congestion of traffic is suppressed.

In addition, the present invention is not limited to the embodiment described above. For example, although the packet processing device 100 is connected to the server 10 that transmits data in the embodiment described above, the packet processing device 100 may also be connected to the client 30 in the case of bidirectional data communication. In addition, the packet processing device 100 may be integrated with the server 10.

In addition, the round-trip delay time estimation unit 150 may calculate a plurality of latest round-trip delay times and estimate the average value or the minimum or maximum value as the round-trip delay time of the packet.

DESCRIPTION OF REFERENCE NUMERALS AND SIGNS

10: server
20: WAN
30: client
100: packet processing device
110: transmission packet receiving unit
120: packet transmission unit
121: packet queue
122: scheduler
130: response receiving unit
140: response transmission unit
150: round-trip delay time estimation unit
160: size determination unit
170: transmission rate update unit

What is claimed is:

1. A packet processing method performed by a packet processing device that receives packets sequentially from a transmission side device and transmits the packets to a receiving side device, comprising:
   a response receiving step of receiving an acknowledgement that is transmitted from the receiving side device corresponding to the packets transmitted to the receiving side device;
   a round-trip delay time estimation step of estimating a time, which is taken until the acknowledgement corresponding to the packets is received from the receiving side device after the packets are transmitted to the receiving side device, as a round-trip delay time of the packets;
   a size determination step of determining a size of data that is divided into the packets and is continuously transmitted to the receiving side device even if the transmission side does not receive an acknowledgement;
   a transmission rate update step of updating a transmission rate of packets transmitted to the receiving side device according to the size of the data determined in the size determination step and the round-trip delay time estimated in the round-trip delay time estimation step; and
   a transmission step of transmitting the packets to the receiving side device at uniform time intervals and at the transmission rate updated in the transmission rate update step.

2. The packet processing method according to claim 1, wherein the round-trip delay time estimation step is performed whenever the packet processing device receives the acknowledgement from the receiving side device.

3. The packet processing method according to claim 2, wherein in the size determination step, the size of the data is increased or decreased according to a reception situation of the acknowledgement received in the response receiving step.

4. A packet processing device that receives packets sequentially from a transmission side device and transmits the packets to a receiving side device, comprising:
   a response receiving unit that receives an acknowledgement that is transmitted from the receiving side device corresponding to the packets transmitted to the receiving side device;
   a round-trip delay time estimation unit that estimates a time, which is taken until the acknowledgement corresponding to the packets is received from the receiving side device after the packets are transmitted to the receiving side device, as a round-trip delay time of the packets;

a size determination unit that determines a size of data that is divided into the packets and is continuously transmitted to the receiving side device even if the transmission side does not receive an acknowledgement;

a transmission rate update unit that updates a transmission rate of packets transmitted to the receiving side device according to the size of the data determined by the size determination unit and the round-trip delay time estimated by the round-trip delay time estimation unit; and a transmission unit that transmits the packets to the receiving side device at uniform time intervals and at the transmission rate updated by the transmission rate update unit.

5. The packet processing device according to claim 4, wherein the round-trip delay time estimation unit estimates the round-trip delay time whenever the response receiving unit receives the acknowledgement.

6. The packet processing device according to claim 5, wherein the size determination unit increases or decreases the size of the data according to a reception situation of the acknowledgement received by the response receiving unit.

* * * * *